(12) United States Patent
Nagoshi et al.

(10) Patent No.: US 7,551,318 B2
(45) Date of Patent: Jun. 23, 2009

(54) IMAGE PROCESSING APPARATUS AND IMAGE PROCESSING METHOD

(75) Inventors: Shigeyasu Nagoshi, Tokyo (JP); Akihiko Nakatani, Tokyo (JP); Okinori Tsuchiya, Tokyo (JP); Makoto Torigoe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 972 days.

(21) Appl. No.: 10/971,970

(22) Filed: Oct. 22, 2004

(65) Prior Publication Data

US 2005/0088675 A1  Apr. 28, 2005

(30) Foreign Application Priority Data

Oct. 24, 2003 (JP) .............................. 2003-365137
Dec. 2, 2003 (JP) .............................. 2003-403757

(51) Int. Cl.
*H04N 1/60* (2006.01)

(52) U.S. Cl. .................. 358/1.9; 358/518; 358/520; 358/521; 345/590; 345/596

(58) Field of Classification Search ................. 358/1.9, 358/518, 521, 520, 522, 504; 382/167; 345/590, 345/594, 596, 597, 601
See application file for complete search history.

(56) References Cited

U.S. PATENT DOCUMENTS

| | | | | |
|---|---|---|---|---|
| 4,831,434 A | * | 5/1989 | Fuchsberger | 358/521 |
| 5,212,546 A | * | 5/1993 | Arazi et al. | 358/518 |
| 5,500,921 A | * | 3/1996 | Ruetz | 358/1.9 |
| 5,539,523 A | * | 7/1996 | Nakai et al. | 358/296 |
| 5,712,925 A | * | 1/1998 | Ohga | 382/167 |
| 6,778,186 B2 | * | 8/2004 | Mehigan | 345/596 |
| 7,006,105 B2 | * | 2/2006 | Deishi et al. | 345/590 |
| 7,450,281 B2 | * | 11/2008 | Torigoe et al. | 345/594 |
| 7,453,602 B2 | * | 11/2008 | Shimada | 358/1.9 |
| 2002/0000993 A1 | * | 1/2002 | Deishi et al. | 345/590 |
| 2002/0005855 A1 | * | 1/2002 | Mehigan | 345/596 |
| 2003/0202194 A1 | * | 10/2003 | Torigoe et al. | 358/1.9 |
| 2007/0229868 A1 | * | 10/2007 | Kanai | 358/1.9 |
| 2008/0088892 A1 | * | 4/2008 | Cho et al. | 358/504 |
| 2008/0106508 A1 | * | 5/2008 | Lee | 345/89 |

FOREIGN PATENT DOCUMENTS

| | | | |
|---|---|---|---|
| JP | 06-169395 | * | 6/1994 |
| JP | 6-169395 | | 6/1994 |
| JP | 2001-016475 | * | 1/2001 |

(Continued)

*Primary Examiner*—Kimberly A Williams
(74) *Attorney, Agent, or Firm*—Canon U.S.A. Inc., I.P. Division

(57) ABSTRACT

The gray axis is adjusted such that an optimal representation can be achieved for low saturation colors close to the gray axis. A test pattern including a plurality of images, which have different color tones is printed, and a user selects a most desirable image. The gray axis of an image recording system is adjusted depending on which image is selected. Each of the plurality of images of the test pattern is a photographic color image represented mainly by low saturation colors close to achromatic colors along the gray axis. In accordance with the selected image, the gradation adjustment is performed for each ink color of the image recording system thereby adjusting the gray axis and the tone of colors close to the gray axis.

5 Claims, 13 Drawing Sheets

FOREIGN PATENT DOCUMENTS

| | | | |
|---|---|---|---|
| JP | 2001-309193 | * | 11/2001 |
| JP | 2002-094809 | * | 3/2002 |
| JP | 2002-094809 A | | 3/2002 |
| JP | 2003-134354 | * | 5/2003 |
| JP | 2003-209702 | * | 7/2003 |

* cited by examiner

IMAGE PROCESSING APPARATUS AND IMAGE PROCESSING METHOD

This application claims priority from Japanese Patent Application Nos. 2003-403757 filed Dec. 2, 2003 and 2003-365137 filed Oct. 24, 2003, which are hereby incorporated by reference herein.

BACKGROUND OF THE INVENTION

1. Field of the Invention

The present invention relates to an image processing method and system capable of achieving a good representation of gray and other colors.

2. Description of the Related Art

Conventional ink-jet recording systems have a gray axis adjustment capability or black/color adjustment capability that allows for adjustment of an image's gray tone. Some users like cool gray, while others prefer warm gray, and yet other users prefer neutral gray. In view of the above, it is known to present a set of images having different gray tones so that a user can select a desirable tone.

FIG. 12 shows an example of a conventional test pattern for use in black and color adjustment. The test pattern includes a background and various patches. The background is printed using only black ink so that the tone of the black ink can be evaluated from the background. The patches are printed using color inks so that they have colors obtained by a mixture of three colors: cyan, magenta, and yellow. In FIG. 12, 99 patches 01 to 99 are arranged in an array such that the proportion of cyan, magenta and yellow is gradually varied from one patch to another thereby varying the color tone of the patches. From the 99 patches, the user then selects a patch having a color most similar to the tone of the background color printed with black ink, and the gray axis is adjusted depending on which patch is selected. Hewlett-Packard Co. employs this method, for example, in its printer CP1160.

FIG. 13 shows an example of a conventional test pattern image used to adjust the gray axis. In this example, each patch of the test pattern is a monotone image of a woman, and the 99 patches of FIG. 12 are arranged such that the color tone of the 99 patches is gradually varied from one patch to another by varying the ratios of color inks of cyan, magenta, and yellow. When the user selects a patch with the most desirable color tone, the gray axis is adjusted based on the selected patch.

However, in the conventional adjustment methods, the tone of low saturation colors is difficult to determine, although the relationship between gray and black or a set of color inks can be determined and the gray axis can be adjusted so as to obtain a desirable gray tone. This is because the adjustment is performed in terms of the gray axis and black.

Low saturation colors refer to colors having low saturation close to the gray axis. Specific examples include human skin color, the color of a stone or concrete building, the color the textual pattern of a mountain, ground color and the color of animal hair. Note that colors cited herein as examples are known as memory colors. These colors are strongly influenced by the setting of the gray axis. For example, if the gray axis is somewhat shifted toward blue, the skin color region close to the gray axis is also shifted toward blue along with the gray axis. As a result, the skin color becomes more bluish and less yellowish. Memory color refers to a color that is in memory of observers or a color that is incorrectly believed to be so although the actual color is different. If a color represented in a photographic picture is different from a corresponding memory color, a user will evaluate the picture as being significantly low in picture quality, even when the printed color is very similar to the real color.

When data is R=G=B, this data is gray-scale data. In many recent color ink-jet printers, in order to achieve fine granularity, gray colors with low lightness are obtained in the form of composite black using C, M, and Y inks, even when K (black) ink is available. In this case, the numbers of printed dots of C, M, and Y are controlled by the printer driver (implemented by software) or the like so that the resultant color seems like an achromatic color with coordinates of a=b=0 in CIELab color space.

To deal with color tone variations, Japanese Unexamined Patent Application Publication No. 2001-16475 discloses control of the color tone of image data such that colors fall within a range of 90° in the ab plane of CIELab color space. Moreover, Japanese Unexamined Patent Application Publication No. 2003-209702 has also disclosed control of the gray tone toward a negative direction along the b axis in the ab plane of CIELab color space such that high-fidelity gray is represented on a display or such that memory colors are represented in a desirable fashion. Users seek to achieve high-fidelity representation on a monitor or to achieve a good representation for memory colors by controlling the gray tone toward the negative direction along the b axis in the ab plane of CIELab. In silver halide monochrome photography, in contrast, most b-values are positive or located close to the origin. Thus, the target gray tone is not necessarily equal for all given images. This makes it difficult to achieve a desirable color tone in a printed image, depending on given image data.

As for colors other than gray, for example, blue, it is desirable, in some cases, to achieve a good representation of a memory color for the sky or the sea. But, in some cases, a good representation of a memory color is not needed, as in the case of an image of clothes.

SUMMARY OF THE INVENTION

In view of the above, an advantage of the image processing system of the present invention is that it is capable of attaining quality gray tone representation.

Another advantage of the present invention is that low saturation colors that are closer to the neutral axis can be adjusted.

Various aspects of the present invention can be found. In one aspect, the present invention provides an image processing method of adjusting a gray axis of an image recording system in accordance with an image selected from a set of test images varying in color tone from one image to another. Among other steps, the method includes adjusting the color tone associated with the gray axis by providing gradation adjustment separately for each ink color of the image recording system on the basis of the selected one image, wherein the plurality of images included in the set of test images are color images formed using a plurality of low saturation colors close to achromatic colors along the gray axis.

According to another aspect, an image processing method for adjusting a gray axis of an image recording system is disclosed. Among other steps, the method includes generating a plurality of test images by using low saturation colors that are achromatic and close the gray axis; receiving a user input indicating selection of a test image from the plurality of test images, wherein each test image varies in color tone; and using the selected test image to adjust the color tone of the gray axis separately for each ink color of the image recording system.

Further features and advantages of the present invention will become apparent from the following description of the preferred embodiments with reference to the attached drawings.

DETAILED DESCRIPTION OF THE EMBODIMENTS

The present invention is described in further detail below with reference to embodiments in conjunction with the accompanying drawings.

First Embodiment

In the first embodiment, adjustment of gray color (an achromatic color) is implemented by using a test pattern. This test pattern is a photographic color image consisting of other low saturation or achromatic colors along the gray axis.

Figure 1:
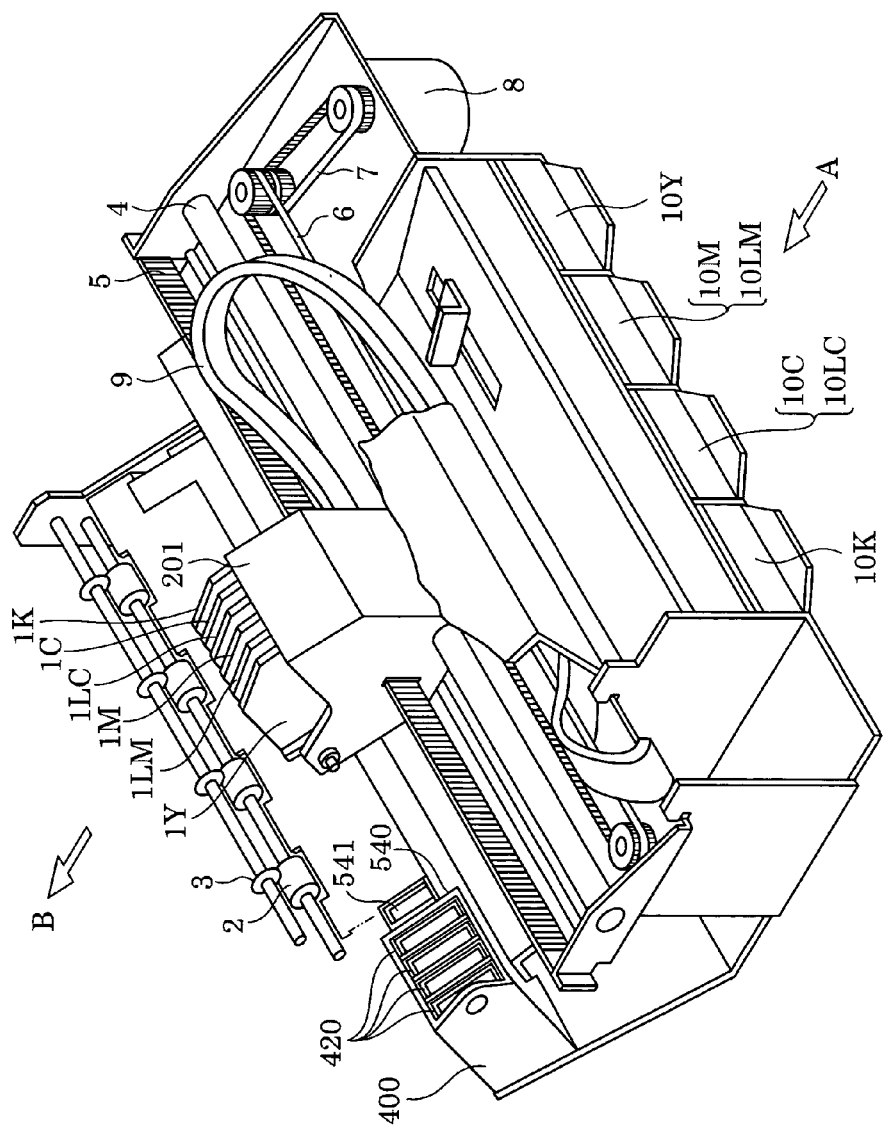
FIG. 1 is a perspective view of an ink-jet color printer according to an embodiment of the present invention.

FIG. 1 shows an ink-jet color printer according to the present embodiment of the invention. In FIG. 1, a print head assembly 1 includes a nozzle array for firing out ink droplets to form dots on a recording medium. The print head assembly 1 includes a plurality of print heads 1K (dark black), 1C (dark cyan), 1LC (light cyan), 1M (dark magenta), 1LM (light magenta), and 1Y (dark yellow), which are disposed side by side on a carriage 201. A color image can be formed on a recording medium by combining color dots formed by ink droplets from colors emitted from the print heads. Print data is supplied to the print heads from the printer circuitry via a cable 9.

In the present embodiment, of the six colors used, dark cyan ink and light cyan ink are formed of the same coloring material although the material has different densities. The dark cyan ink has a higher coloring material density than the light cyan ink. A dye or a pigment is used as the coloring material. Note that the difference in lightness/darkness of each color ink can be obtained not only by controlling the density of the coloring material but also by changing the type of coloring material. The composition or the type of ink solvent may be different depending on the density of the ink. Note that the color can be the same regardless of the composition or the type of the solvent. The above discussion can also be applied to the dark magenta ink and the light magenta ink. In some printers, high (dark) and low (light) density inks are also used for yellow. In this case, a total of seven color inks are used.

Inks are supplied separately from respective ink cassettes 10K (FIG. 1), 10C, 10LC, 10M, 10LM, and 10Y to the respective print heads. In the present embodiment, the dark cyan ink and the light cyan ink are disposed in a single ink cassette, and the dark magenta ink and the light magenta ink are disposed in another single ink cassette.

The above-described print head assembly 1 is generally called a longitudinal print head assembly. In the longitudinal type, a plurality of print heads corresponding to respective ink colors are arranged in the main scanning direction in which the carriage 201 is moved. On the other hand, in a transverse type, the print heads for emitting ink are arranged in a transverse direction perpendicular to the main scanning direction in which the carriage is driven, that is, the print heads are arranged in a direction in which recording medium is fed. In the transverse type, a plurality of inks can be placed in a smaller space than is needed in the longitudinal type, and thus use of the transverse type can result in a reduction in the total size of the system. In the transverse type, the order of emitting color inks is not reversed even in bidirectional printing, and thus a smaller color shift can be achieved compared to the longitudinal type.

A speed detection unit 5 detects the scanning speed and the printing position of the carriage 201. The speed detection unit 5 then controls the motion of the carriage 201 in the main scanning direction based on the detected scanning speed and printing position. A carriage drive motor 8 serves as a power source for moving the carriage 201. The driving power supplied by the carriage drive motor 8 is transmitted via belts 6 and 7 to the carriage 201 thereby moving the carriage 201 along a sliding shaft. Printing is performed while the carriage 201 moves in the main scanning direction.

A recovery unit 400 maintains the print head in good condition. When the printer is not printing, ink emission surfaces of the individual print heads of the print head assembly 1 are covered by a series of caps 420 to prevent the emission surfaces from being dried. The position at which the carriage 201 is located facing the recovery unit 400 is called a home position.

When the printer is printing, the recovery unit 400 functions as follows. One or more nozzles of the print head can remain inactive when data is not supplied to it. If no ink is emitted for a predetermined period of time, previously emitted ink dries out and hardens on the surface of the print head. This results in performance degradation in ink emission, which causes degradation in image quality.

To prevent the above problem, the print head assembly 1 intermittently emits ink from respective nozzles even when no print data is supplied, thereby maintaining the print head surface in a good condition. The emission of ink for the above purpose is called auxiliary emission. In the auxiliary emission, inks are emitted toward the caps 420 of the recovery unit 400 so that emitted ink does not smear the printer or recording medium. The emitted ink is collected by a recovery pump (not shown) into a waste ink storage tank. Therefore, when auxiliary emission is performed during a print operation, the carriage 201 is moved to the home position so that the carriage 201 faces the series of caps 420 regardless of whether the carriage 201 is driven in the single-direction mode or bidirectional mode.

The recording medium is fed from the direction denoted by an arrow A in FIG. 1 toward the printing position. When the recording medium reaches the printing position, printing is performed by the print head assembly 1. After completion of printing, the recording medium is fed out by paper ejection mechanisms 2 and 3 in the direction denoted by an arrow B.

Figure 2:
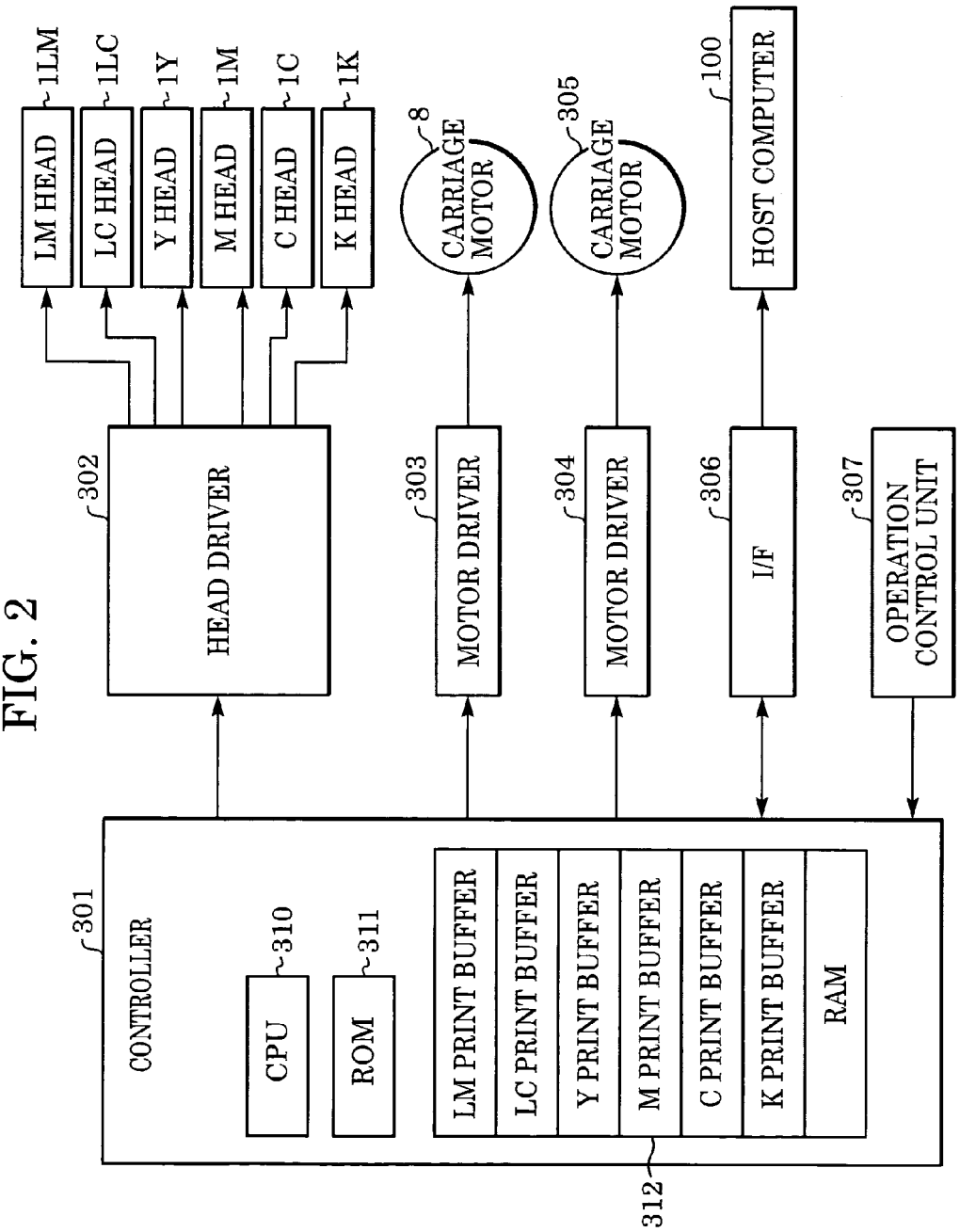
FIG. 2 is a block diagram of a control system of an ink-jet color printer.

FIG. 2 shows functional blocks of a control system for an ink-jet color printer in accordance with an embodiment of the present invention. The controller 301 is a control unit for generally controlling the operation of the ink-jet color printer. The controller 301 includes a CPU such as a microprocessor 310, a ROM 311 in which a control program executed by the CPU 310 and various data are stored, and a RAM 312 used as a work area in various processes performed by the CPU 310 and also used to temporarily store various data.

The RAM 312 includes a receiving buffer for storing recording data received from the host computer and print buffers for storing print data corresponding to the plurality of print heads 1C, 1M, 1Y, 1K, 1LC, and 1LM In FIG. 2, those print buffers are respectively denoted as a C print buffer, an M print buffer, a Y print buffer, a K print buffer, an LC print buffer, and an LM print buffer.

A head driver 302 drives the plurality of print heads 1C, 1M, 1Y, 1K, 1LC, and 1LM in accordance with the print data of the respective colors output from the controller 301. A motor driver 303 drives the carriage drive motor 8. A motor driver 304 drives a paper feed motor (not shown). An interface 306 interfaces the ink-jet color printer with the host computer. An operation control unit 307 includes various keys operated by a user and also includes a display such as an LCD.

Figure 3:
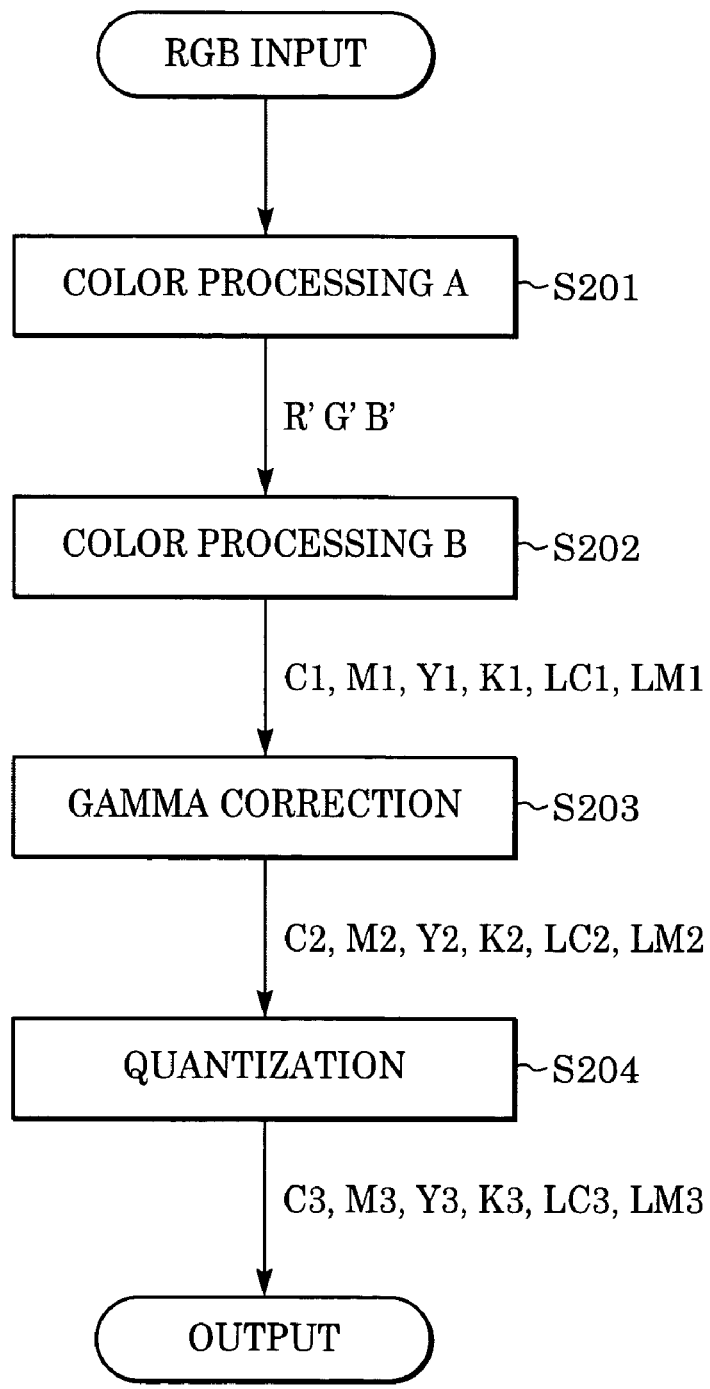
FIG. 3 is a flow chart showing image processing performed by an ink-jet color printer according to an embodiment of the present invention.

FIG. 3 shows a flow chart for performing image processing using an ink-jet color printer in accordance with an embodiment of the present invention. One or more steps of the image processing shown in FIG. 3 may be performed by the ink-jet color printer serving as the recording system, or the image processing may be performed by the host computer and the resultant data may be transmitted to the ink-jet color printer. The present invention has no particular restriction on where the image processing is performed. When processing is performed on the host computer, the process shown in FIG. 3 is performed by the host computer 100 shown in FIG. 2, and the result is transmitted as print data to the interface 306.

An original image signal including R, G, and B components (hereinafter, referred to simply as an RGB signal) output from an input device such as a digital camera or a scanner or produced by a computer is converted into an R'G'B' signal via color processing A (step S201). Note that the color processing A is performed to convert an original signal into an image signal adapted to the color representation ranges of the recording system. Color processing B is then performed to convert the R'G'B' signal into a signal consisting of components corresponding to the respective ink colors (step S202). More specifically, the RGB intensity signal is converted into a CMY intensity signal used by the recording system. In the present embodiment, color intensity signals C1, M1, Y1, K1, LC1, and LM1 corresponding to the respective six color inks are produced via the color processing B.

Gamma ($\gamma$) correction is then performed by using a gamma correction table (step S203). The gamma correction table includes a plurality of gradation correction tables corresponding to the respective colors. When a given original image signal has a linear relationship between the input signal value and the lightness or the intensity, the gamma correction is performed so that a linear relationship is obtained between the input signal value and the lightness or the intensify of the printed image. In this manner, a linear gradation characteristic can be obtained so that good gradation characteristics can be obtained when interpolation is performed.

After completion of the gamma correction, the resultant image intensity signals C2, M2, Y2, K2, LC2, and LM2 are converted (step S204) into binary signals by means of quantization, and thus image signals C3, M3, Y3, K3, LC3, and LM3 to be supplied to the respective print heads 1C, 1M, 1Y, 1K, 1LC, and 1LM are obtained. In the conversion into binary signals (step S204), an error diffusion method or a dithering method is generally used. In the dithering method, the binarization is obtained using dither patterns in which pixels are assigned different threshold values used in thresholding the intensity signals.

Figure 4:
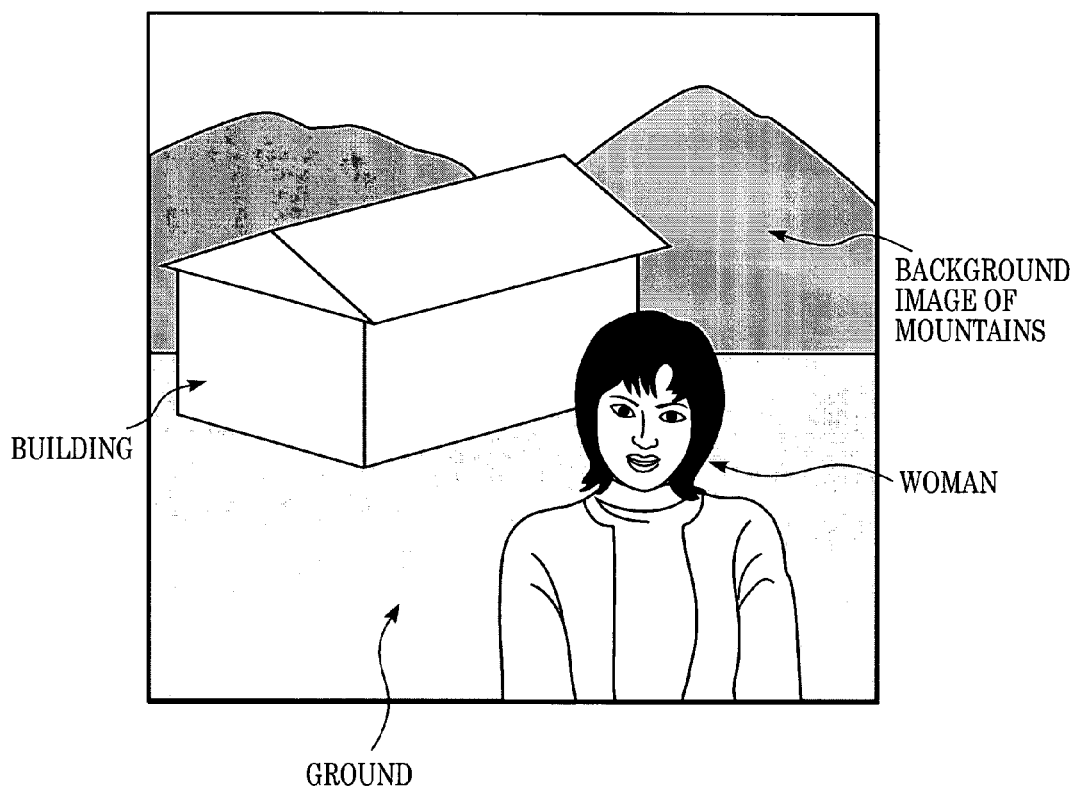
FIG. 4 illustrates an exemplary image test pattern according to an embodiment of the present invention.

FIG. 4 shows an example of a image test pattern according to an embodiment of the present invention. Here, the gray axis is determined based on the image test pattern that includes both achromatic colors and low saturation chromatic colors. This test pattern includes a number of images including a human face, a mountain with a textural shape, a building, and the ground, which images are represented using low saturation colors. Specifically, note that the images are represented in color and not in monochrome. For example, the human face is represented by a low saturation color between yellow and red, the textural pattern of the mountain by a color with relatively low lightness close to the gray axis, the ground by a color with a relatively high lightness close to gray, and the building by a low saturation color close to yellow or cyan. The image test pattern with the color images is then printed.

The gray axis is then shifted toward yellow, red, magenta, blue, cyan, or green. As a result of the gray axis shift, the low saturation colors in FIG. 4 change. A plurality of frames of photographic image are placed in respective ones of the 99 patches shown in FIG. 6 such that the gray axis and thus color tones close to the gray axis change from one patch to another. A user selects the patch having best color tones from the 99 patches. In accordance with the selected patch, the gray axis is then determined. In the selection, the user can select a patch having most desirable overall color tones of the human face, the ground, and the building from many patches whose color tones vary depending on the shift of the gray axis. This method allows the gray axis to be determined such that more natural tones can be obtained in low saturation colors close to the gray axis than can be obtained when the gray axis is determined based on patches with achromatic colors along the gray axis.

The method of changing the tone of the gray axis is described in further detail below. When a user selects one of the 99 patches, values used in the gamma correction step S203 of FIG. 3 are changed in accordance with the selected patch thereby determining the tone of the gray axis. The values used in the gamma correction may be determined using a table prepared in advance. Alternatively, changes in ink amount for the patches may be calculated in advance for respective color inks, and a basic gamma correction table may be produced on the basis of the changes in amount of ink. A gamma correction table for a particular patch may be calculated from the basic gamma correction table. As described above, gamma correction occurs by performing gradation adjustment for each ink color. In the present embodiment, because six colors are used, the gray axis tone is changed by adjusting the intensity of each of six color inks, that is, the amount of each ink that is used. More specifically, the intensity of each ink is changed as follows.

1) To shift the gray axis toward red, the intensities of magenta, light magenta, and yellow are increased, or the intensities of cyan and light cyan are reduced.

2) To shift the gray axis toward magenta, the intensities of magenta and light magenta are increased, or the intensities of cyan, light cyan, and yellow are reduced.

3) To shift the gray axis toward blue, the intensities of cyan, light cyan, magenta, and light magenta are increased, or the intensity of yellow is reduced.

4) To shift the gray axis toward cyan, the intensities of cyan and light cyan are increased, or the intensities of magenta, light magenta, and yellow are reduced.

5) To shift the gray axis toward green, the intensities of cyan, light cyan, and yellow are increased, or the intensities of magenta and light magenta are reduced.

6) To shift the gray axis toward yellow, the intensity of yellow is increased, or the intensities of cyan, light cyan, magenta, and light magenta are reduced.

As described above, the color tone is changed by changing the gradation correction table. Note that when the test pattern shown in FIG. 4 is printed, the printing is performed using the existing gradation correction table without changing the gradation correction table from one patch to another. This can also be applied to the second and third embodiments as described below.

Second Embodiment

Figure 5:
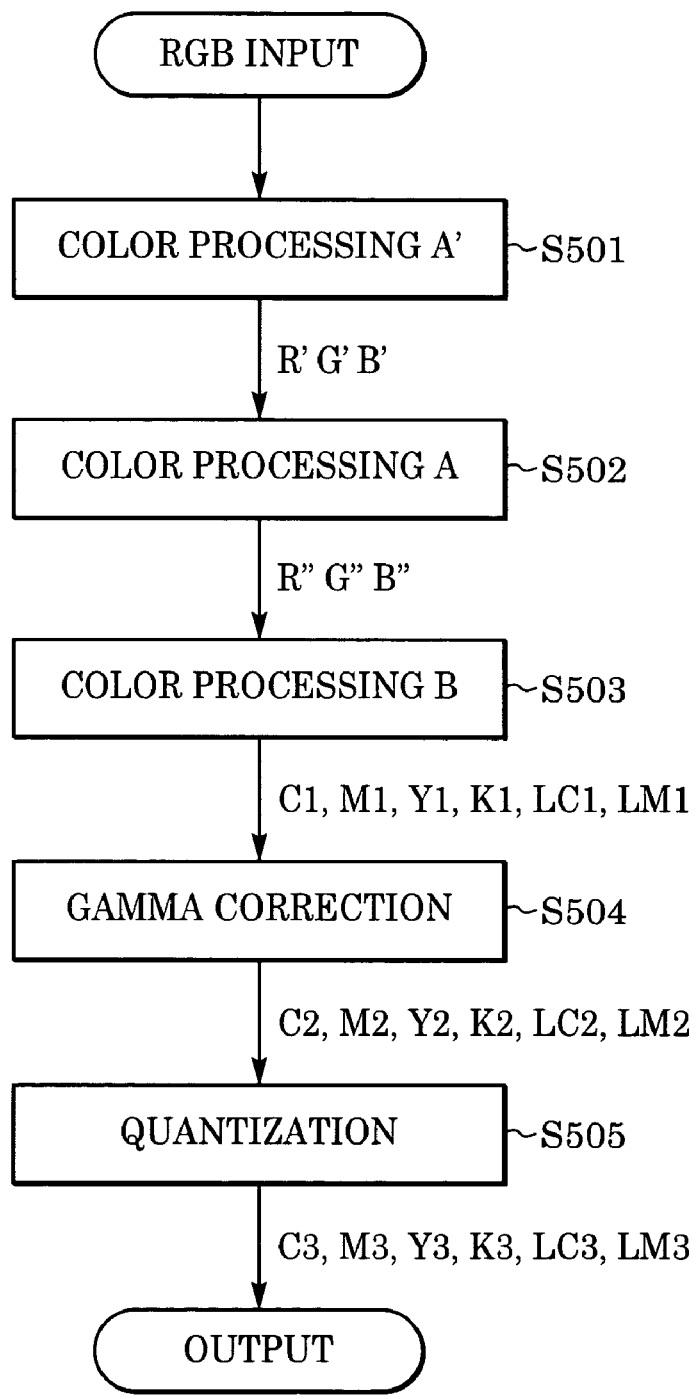
FIG. 5 is a flow chart showing image processing performed by an ink-jet color printer according to an embodiment of the present invention.

FIG. 5 shows a flow chart for image processing according to a second embodiment of the present invention. In this second embodiment, the gray axis and low saturation colors are adjusted by performing color processing A' (in step S510). In color processing A', the color tone or the gradation characteristic is adjusted without changing the original image data. More specifically, image data is analyzed, and white balance correction, color seepage correction, and gradation correction are performed in accordance with the analysis result so that a suitable intensity characteristic is obtained. Further, unlike color processing A, compression/decompression of the color space is not performed in color processing A'.

In other words, color processing A' is performed to retouch given image data into more desirable image data. When a suitable printed image is not obtained from original image data, the image data is corrected via color processing A' to obtain a suitable printed image. More specifically, RGB values of the original image data are changed in color processing A'. To shift the gray axis toward red from the neutral position where R=G=B, the R value is increased. To shift the gray axis toward yellow, R and G values are increased. Note that not only is the gray axis, but the RGB values of low saturation colors are changed.

As described above, in color processing A', the gray axis and the tones of colors close to the gray axis are adjusted by changing the RGB values. In FIG. 5, the resultant changed RGB values are denoted as R'G'B'. Thereafter, as in the image processing shown in FIG. 3, color processing A (step S502), color processing B (step S503), gamma correction (step S504), and quantization (step S505) are performed, to provide an output.

In this second embodiment, color tones for the gray axis and low saturation colors close to the gray axis can be changed. In other words, if desired, high saturation colors can be maintained without being influenced by the change of the gray axis. That is, when it is desirable that high saturation colors should be independent of the determination of the gray axis, the high saturation colors can be maintained without being changed.

Third Embodiment

In this third embodiment, the gray axis and colors close to the gray axis are adjusted in the color processing A (step S502) and the color processing B (step S503) shown in FIG. 5. In the color processing B, the gray axis is adjusted. As in the first embodiment, as many color processing tables corresponding to the changed gray axis are prepared as the number of tones into which the current tone can be chanted. More specifically, in the color processing B in FIG. 5, the amounts of emitted inks C1, M1, Y1, K1, LC1, and LM1 are changed depending on the color tone to be achieved. For example, to shift the gray axis toward red, the amounts of M1, Y1, and LM1 are increased. To shift the gray axis toward yellow, a table in which the amount of Y1 is increased is produced.

If the amounts of emitted inks are specified in the color processing B, the ranges within which colors can be represented by the recording system are determined. Then, the embodiment involves determining a color processing table used in the color processing A, in which RGB values corresponding to respective colors within the color representation ranges are described. Thus, when the gray axis and low saturation colors close to the gray axis are changed, a corresponding change in the color processing A is made. For example, when the gray axis is shifted toward red and corresponding changes are made for low saturation colors in the color processing B, the low saturation colors are shifted toward red (in color processing A). The color processing table used in color processing A can be changed such that only the change in the gray axis is reflected, but high saturation colors are not significantly influenced by the change of the gray axis. That is, high saturation colors should be independent of the determination of the gray axis, and the high saturation colors can be maintained without being changed.

In this third embodiment, because the color adjustment is performed using a color processing table in both color processing A and color processing B, the processing can be performed in shorter time than is needed in the second embodiment, although a grater file size is needed to store many color processing tables. Therefore, when the host computer or the recording system has low processing power, it is desirable to employ the process according to the third embodiment.

According to the first to third embodiments, as described above, the adjustment of the gray axis is performed using the test pattern consisting of color images including low saturation colors close to the gray axis, it is possible to properly adjust not only the gray tone but also low saturation colors close to the gray axis so that a good representation of memory colors can be achieved.

Fourth Embodiment

Now, a color image output system is described referring to the accompanying drawings.

Figure 6:
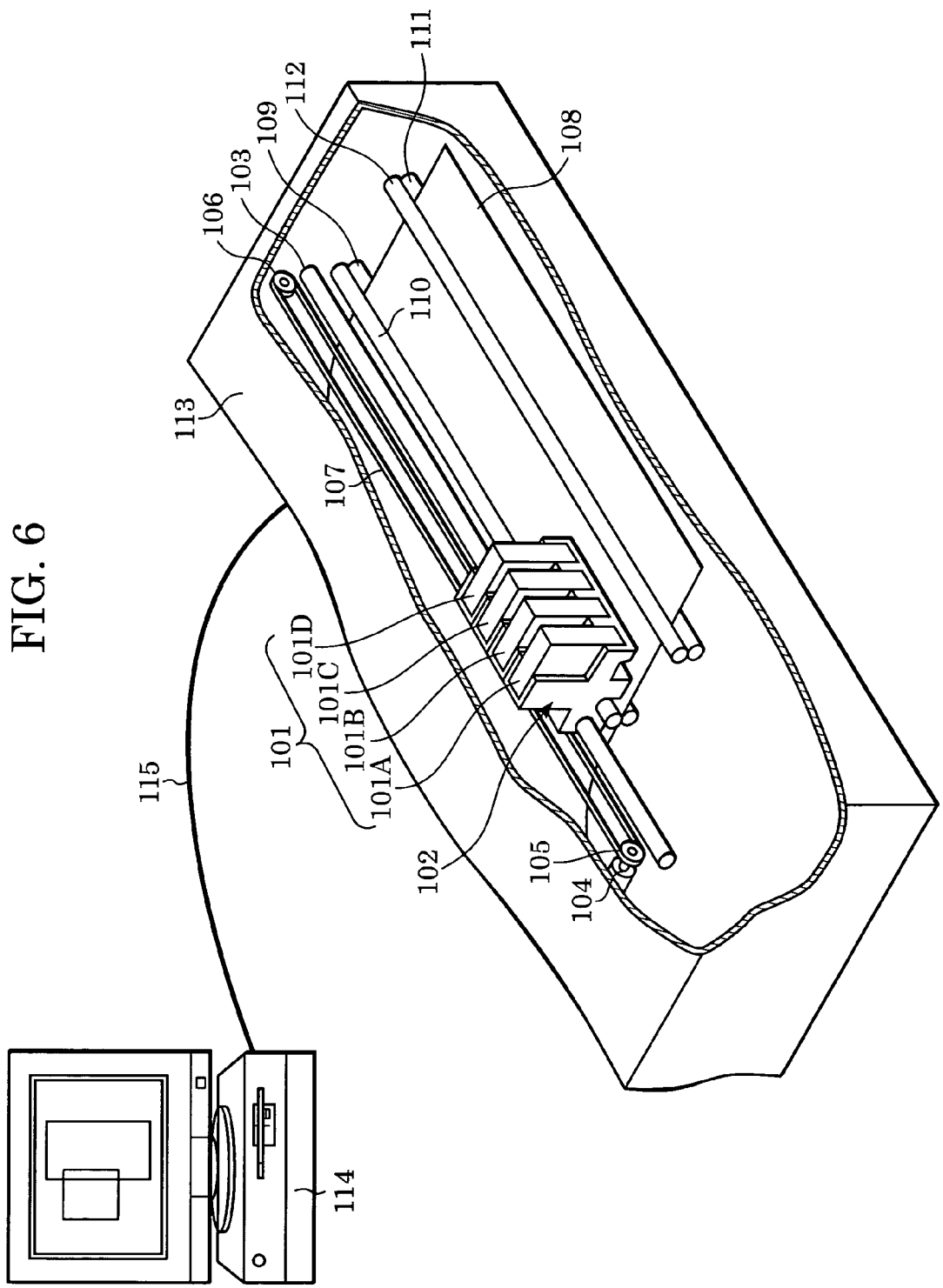
FIG. 6 is a diagram showing a printing system according to an embodiment of the present invention.

FIG. 6 shows a printing system according to an embodiment of the present invention. In FIG. 6, the printing system includes an ink-jet printer 113, in which a plurality of (four, in this specific example) head cartridges (printing units) 101A, 101B, 101C and 101D are exchangeably mounted on a carriage 102. Hereinafter, when the printing units (print heads or head cartridges) 101A to 101D are described or when one of those printing units is described, a generic expression "printing unit" (print head or head cartridge) 101 is used.

Each head cartridge 101 includes an ink tank disposed at an upper location and a print head (ink emission unit) disposed at a lower location, which are integrated in a single piece. Each head cartridge 101 is exchangeably mounted on the carriage 102 at a precisely positioned location. Each head cartridge 101 has a connector (not shown) for receiving a signal by which to drive the print head. The carriage 102 has connector holders (electrical connectors) for transmitting a driving signal to the respective head cartridges 101 via the above-described connectors. Each head cartridge 101 mounted on the carriage 102 and a controller disposed in the main part of the printer are connected with each other via a flexible cable for transmitting a signal pulse and a temperature control current.

Black (K) pigment ink is stored in the ink tank disposed at the upper location of the head cartridge 101A. In the ink tanks of the respective head cartridges 101B, 101C, and 101D, dye inks of cyan (C), magenta (M), and yellow (Y) are stored. Hereinafter, the colors cyan, magenta, and yellow are denoted as CMY, while the colors plus black are denoted by CMYK. An array of emission openings for emitting ink droplets is formed in the surface (facing down in FIG. 6), facing a printing medium 108, of the each print head such that ink stored in the corresponding tank can be emitted via the emission openings.

The carriage 102 is supported by a guide shaft 103 extending in the main scanning direction in the printer such that the carriage 102 can move in both directions along the guide shaft 103. The carriage 102 is driven by a main scanning motor 104 via a motor pulley 105, a driven pulley 106, and a timing belt 107 whereby the position and the motion of the carriage 102 are controlled. A printing medium 108 such as paper or a plastic sheet is disposed between feed rollers 109 and 110 and between feed rollers 11 and 112, and is fed by rotation of the feed rollers through a position (printing position) facing the emission opening face of the print head 101. The backside of the printing medium 108 is supported by a platen (not shown) such that the printing medium 108 is in a flat printing plane at the printing position. The end portion with the emission surface of each head cartridge 101 mounted on the carriage 102 extends downward beyond the lower end of the carriage 102 and is positioned such that the emission surface becomes parallel to the printing medium 108 in an area between the two roller pairs.

The color output system (ink-jet printer) 113 including the components described above is connected to a host computer 114 via a cable 115 and controlled by driver software installed in the host computer 114.

Figure 7:
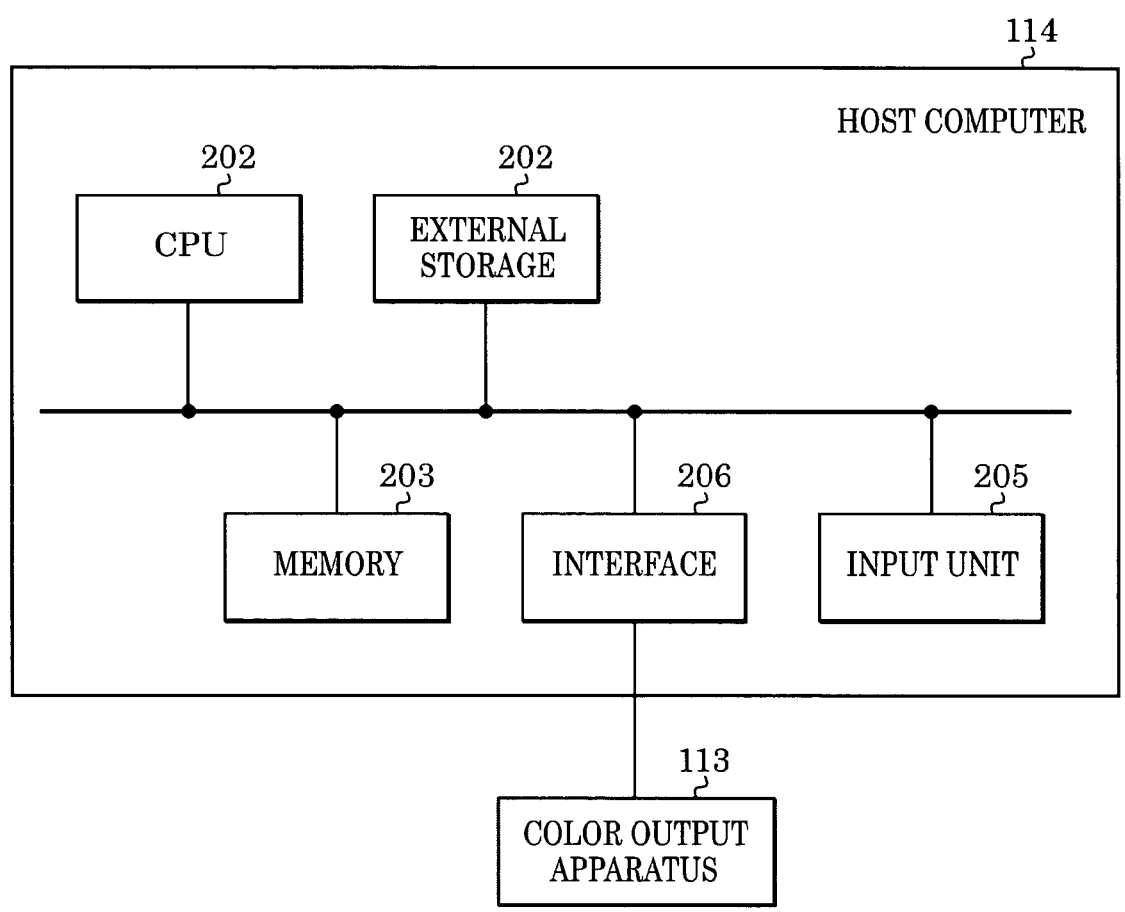
FIG. 7 is a diagram showing functional blocks of an image processing system according to an embodiment of the present invention.

FIG. 7 is a block diagram of an image processing system according to an embodiment of the present invention. In FIG. 7, the host computer 114 includes a CPU 202, a memory 203, an external storage unit 204, an input unit 205 and an interface 206 for interfacing with the color output system 113 (the ink-jet printer in this specific example). The CPU 202 controls and executes various processes including quantization and color processing in accordance with a program stored in the memory 203.

The program is stored in the external storage unit 204 or supplied from other external device. The host computer 114 is connected to the color output system 113 via the interface 206 such that image data subjected to the color processing is transmitted to the color output system 113 via the interface 206. On receiving the image data from the host computer 114, the color output system 113 outputs a color image in accordance with the received image data.

Figure 8:
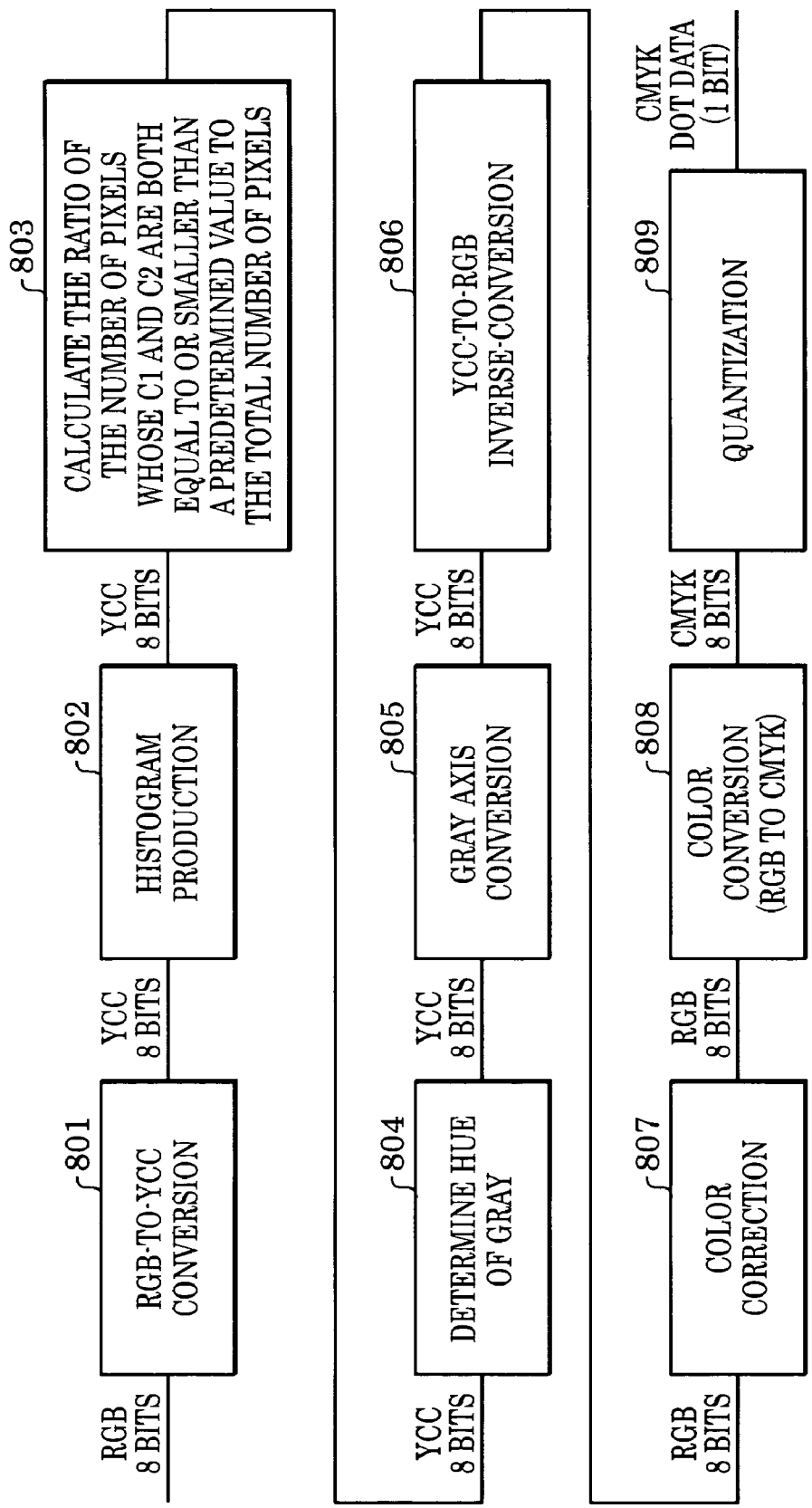
FIG. 8 is a flow chart showing an operation of an image processing system according to an embodiment of the present invention.

FIG. 8 is a flow chart showing a process performed by the image processing system according to the present embodiment of the invention. When 8-bit (256-level) RGB image data is input, the input image data is converted into 1-bit CMYK dot data for each color and the resultant dot data is output.

The image processing system including the functional blocks shown in FIG. 8 is exemplarily implemented in the form of a printer driver that operates on the host computer 114 for controlling the color output system 113.

In FIG. 8, the input 8-bit RGB image data is first converted by RGB-to-YCC luminance/hue converter 801 into 8-bit YCC (luminance/hue) data in accordance with the following formula:

$$Y \text{ (luminance)} = int(0.30R + 0.59G + 0.11B)$$

(Y is an integer)

$C1$ (hue)=$R-Y$ $C2$ (hue)=$B-Y$

In the next step S802, histograms of C1 and C2 are produced. In step S803, the number of pixels less than predetermined values (10 to 20, for example) in C1 and C2 is counted. That is, the number of pixels having colors close to gray is determined. The ratio of the counted number of such pixels to the total number of pixels is then calculated. When the ratio is high, the input image has a large color area close to gray. Conversely, when the ratio is low, the input image has a small color area close to gray. In step S804, depending on the calculated ratio, it is determined whether to modify the gray tone. Although not necessary, it is desirable to set the threshold value to 0.5 to 0.8 with which to compare the above-described ratio to determine whether to modify the gray tone. Use of a value in such a range as the threshold value allows the influence of noise of the image to be minimized. Although in the present embodiment, gray is extracted on the basis of the values of C1 and C2, gray may be extracted from the condition R=B=G.

Figure 9:
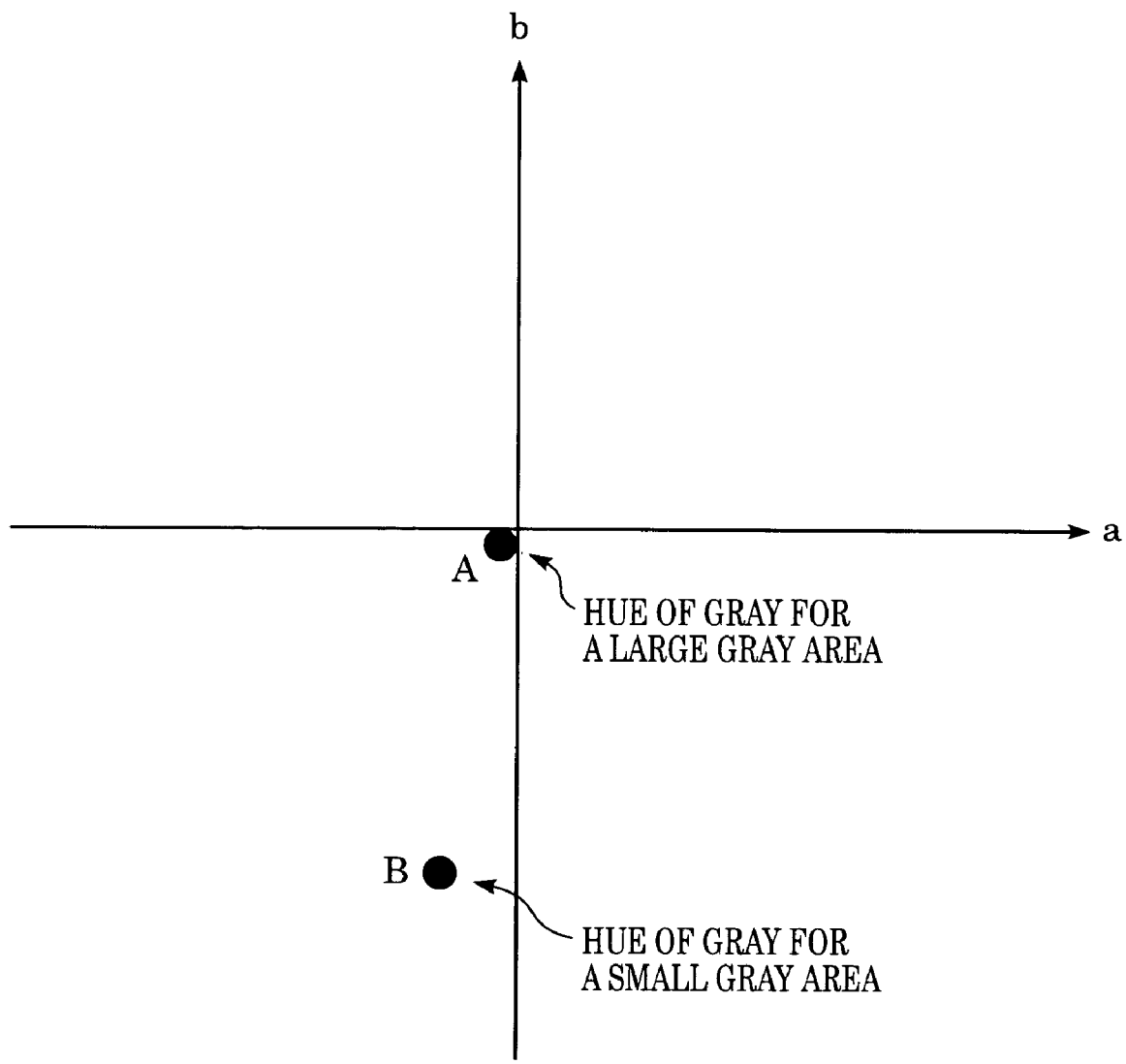
FIG. 9 is a diagram showing how color adjustment is performed in an ab plane in CIELab space, depending on the size of a gray area of specific given image data.

A method of determining the gray tone is now described below with reference to FIG. 9. FIG. 9 is a diagram showing how color adjustment is performed in the ab plane of CIELab, depending on the size of a gray area of given specific image data. When given image data has a large gray area, the gray area in the ab plane of the CIELab color space is set close to the origin, as denoted by A in FIG. 9 so that a tone close to that of a monochrome silver halide photographic image is obtained. Conversely, when image data has a small gray area, the gray area in the ab plane of the CIELab color space is set at a point B shifted from the origin toward the negative direction along the b axis in the ab plane, as in accordance with conventional techniques. Although in the example shown in FIG. 9, the point A has a negative b value, the b component may be positive or zero as long as the point A is located close to the origin.

In step S805, the gray axis for the given image data is converted so that the color tone determined in step S804 is obtained. The gray axis conversion is performed by parallel shifting the Y axis in the YCC space.

Thereafter, in step S806, the YCC data is converted again into RGB data (8 bits) by means of inverse conversion. A color correction (step S807) is then performed using a masking technique or using a 3-dimensional lookup table. Furthermore, color conversion is performed (step S808) using UCR processing or using a 3-dimensional lookup table to obtain 8-bit CMYK data.

Although in the present embodiment, the gray tone is set, in step S804, at point A or B shown in FIG. 9, the gray tone may be set to an arbitrary point between points A and B depending on the ratio of the gray area of given image data to the total area.

In order to adapt to CMYK coloring materials used in the color output system (ink-jet printer) 113, a conversion into CMYK color space is performed. Because the color output system (ink-jet printer) 13 is a binary printer, the resultant 8-bit CMYK data is quantized (step S809) into 1-bit CMYK data. The quantization can be performed using a known error diffusion method or a dithering method.

In the gray axis conversion process in step S805 according to the present embodiment, the color tone is adjusted by parallel shifting the Y axis in the YCC space. This allows the gray tone to be adjusted without having to change the processes in steps S807 to S809 using the same lookup table. Alternatively, after counting of the number gray pixels is completed in step S803, the gray tone may be adjusted in steps S807 to S809.

Sixth Embodiment

Figure 10:
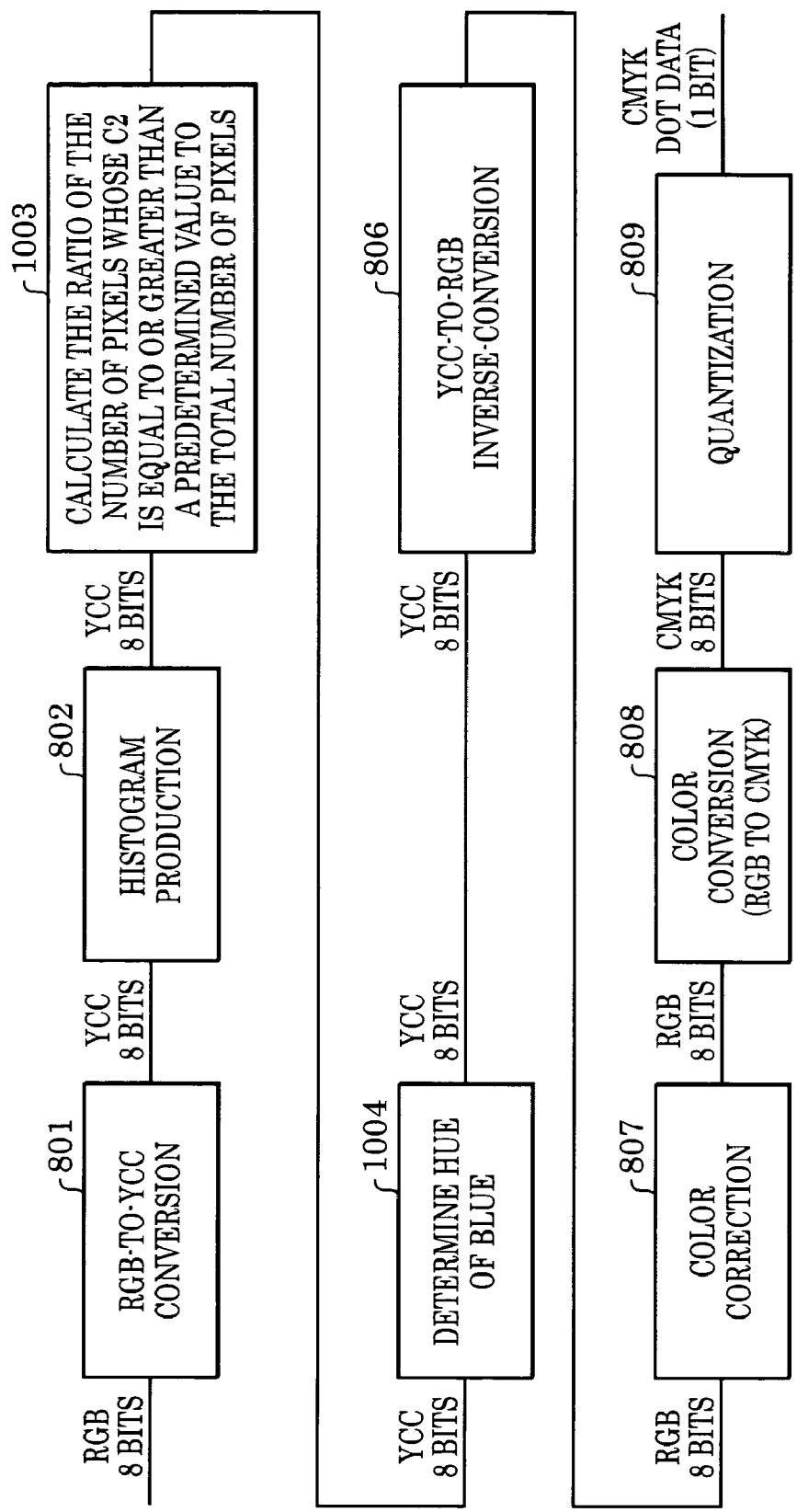
FIG. 10 is a flow chart showing an operation of an image processing system according to an embodiment of the present invention.

In the sixth embodiment, the tone of blue is adjusted depending on the blue area of given image data. FIG. 10 is a flow chart showing a process performed by the image processing system according to the present embodiment of the invention. In FIG. 10, when 8-bit (256-level) RGB image data is input, the input image data is converted into 1-bit CMYK dot data for each color and the resultant dot data is output. In FIG. 10, similar steps to those in FIG. 8 are denoted by similar step numbers. The evaluation of blue in given image data is performed on the basis of the value of C2 in step S1003 corresponding to step S803 of FIG. 8. More specifically, the value of C2 is compared with a predetermined value to determine whether C2 is greater than the predetermined value.

Figure 11:
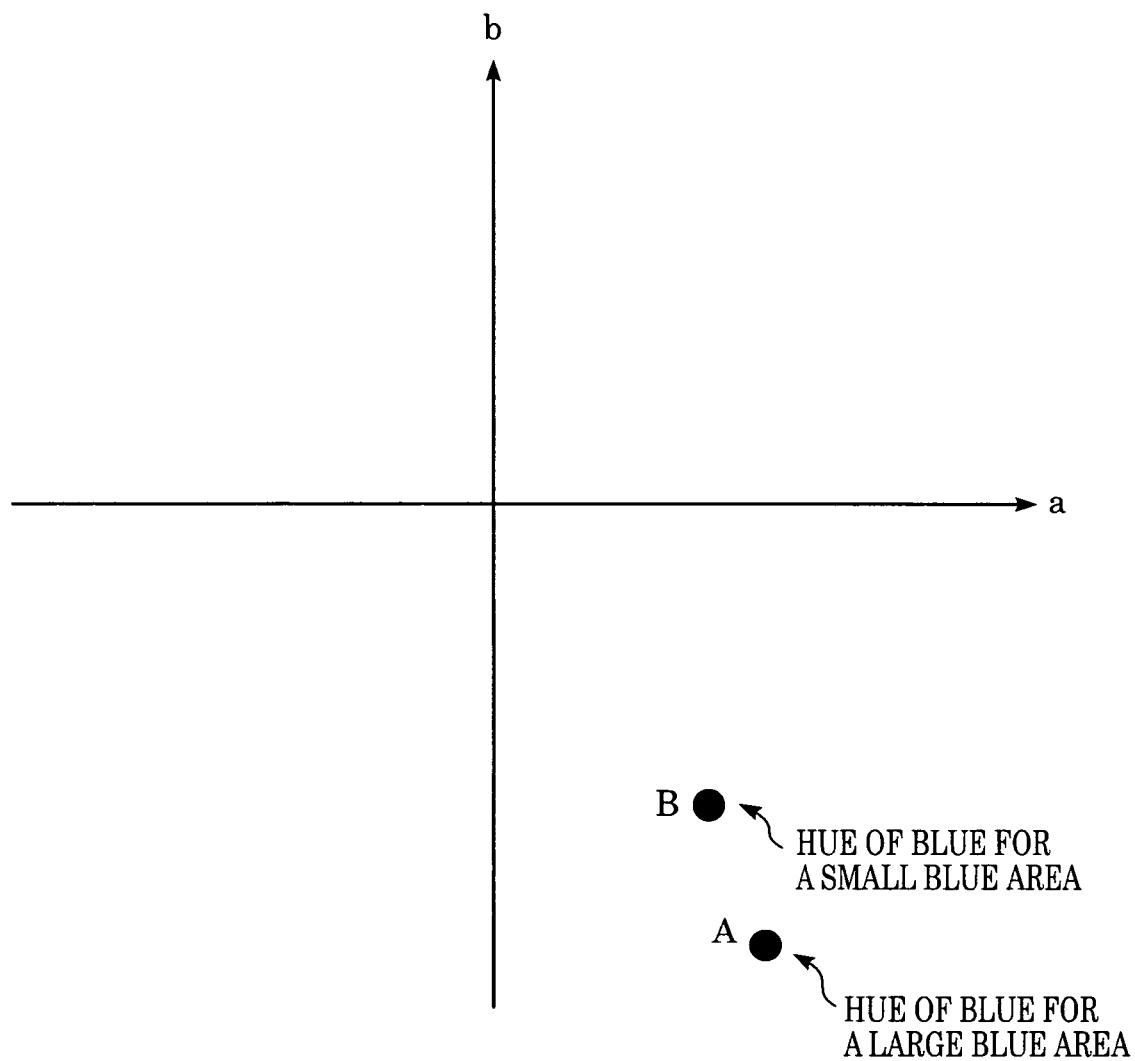
FIG. 11 is a diagram showing how color adjustment is performed in an ab plane in CIELab space, depending on the size of a blue area of specific given image data.
Figure 12:
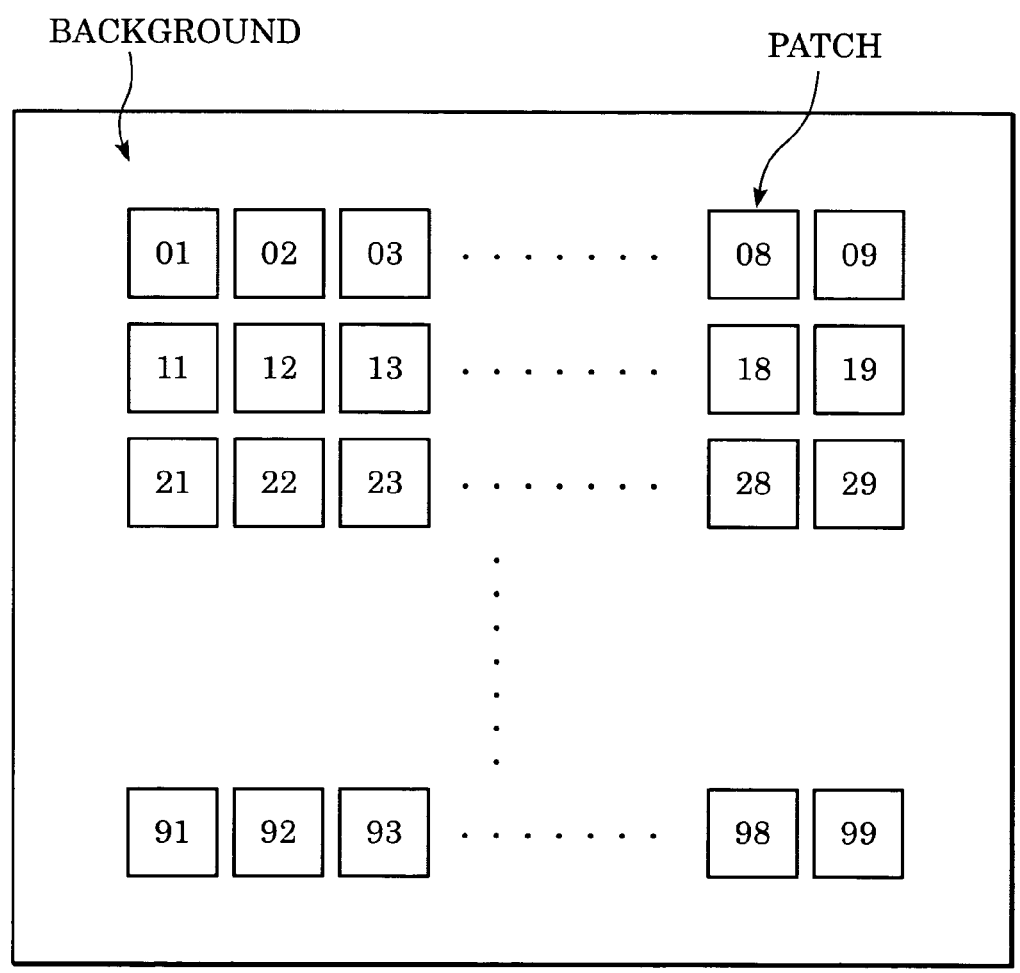
FIG. 12 is a diagram showing a conventional test pattern used in a black and color adjustment.
Figure 13:
FIG. 13 is a diagram showing a conventional image test pattern used in a gray axis adjustment.

In step S1004 corresponding to step S804 of FIG. 8, the tone of blue is adjusted as described below with reference to FIG. 11. FIG. 11 a diagram showing how color adjustment is performed in the ab plane of CIELab space, depending on the size of the blue area of given specific image data. When the given image data has a large blue area, the large blue area can be regarded as corresponding to the sea or the sky area of the given image. Thus, the large blue area is set at point A so that a blue area with high saturation can be obtained to achieve a suitable representation of memory color. Conversely, when the given image data has a small blue area, the blue can be regarded as a non-memory color but one that corresponds to ordinary blue (for example, clothes). Therefore, the blue area is set at point B where the saturation is relatively low. If the threshold ratio of the blue area to the total area is set to 0.2-0.3, images that include a blue area (corresponding to the sea or sky) can be distinguished from images that include an ordinary blue area (corresponding to clothes or the like). The adjustment of blue tone is performed in step S307 by adjusting parameters used in the color correction process. The evaluation of blue in the present embodiment may be performed on the basis of values of C1 and C2 as in the fifth embodiment. The evaluation of blue may also be performed such that the value of B is compared with the values of R and G, and an area having a value of B greater than values of G and R is regarded as a blue area.

In the ink-jet printer according to the present embodiment, four color inks C, M, Y, and K are used. Alternatively, three color inks C, M, and Y or six or seven color inks including inks with light and dark colors for C and M or for C, M, and Y may be employed. The printer is not limited to the ink-jet printer, but the present invention may also be applied to other types of printers such as an electrophotographic printer (for example, a laser beam printer) or a thermal transfer printer. Furthermore, the color output system is not limited to the printer, but a display such as a CRT display or a liquid crystal display may be used as the color output system. Other Embodiments The present invention may also be achieved by providing to a system or a storage medium having software program code stored thereon for implementing the functions disclosed in the embodiments described above and by reading and executing the program code on a computer (or a CPU or an MPU) disposed in the system. In this case, the program code read from the storage medium implements the functions disclosed in the embodiments described above, and the storage medium such as a CD, an MD, a memory card, or an MO on which the program code is stored falls within the scope of the present invention.

The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

The program code stored on the storage medium may be loaded into a memory of an extension board inserted in a computer or into a memory of an extension unit connected to the computer, and part or all of the process may be performed by a CPU disposed on the extension board or the extension unit in accordance with the loaded program code. Such implementation of the functions also falls within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color image processing apparatus comprising:
   determination means for calculating a ratio of an area of gray color in an input color image data with each value of R, G and B being equal within a predetermined margin of error to an entire area of the input color image data, and determining whether the ratio is greater than a predetermined value; and
   color adjustment means for adjusting color of the area of gray color such that, when the ratio is greater than the predetermined value, the color of the area of gray color is adjusted to a first point close to an origin in an ab plane in a CIELab color space where a color adjustment is performed, and when the ratio less than a predetermined value, the color of the area of gray color is shifted to a second point by a predetermined value toward the negative direction along the b axis in the ab plane in the CIELab color space, whereby color image data is generated.

2. The color image processing apparatus according to claim 1, wherein the color adjustment means generates color image data by performing, in accordance with the ratio, the color adjustment on color of the area of gray color to a point between the first point close to the origin in the ab plane in the CIELab color space and the second point shifted by the predetermined value toward the negative direction along the b axis in the ab plane in the CIELab color space.

3. A color image processing method comprising:

calculating a ratio of an area of gray color in an input color image data with each value of R, G and B being equal within a predetermined margin of error to an entire area of the input color image data;

determining whether the ratio is greater than a predetermined value; and adjusting color of the area of gray color such that, when the ratio is greater than the predetermined value, the color of the area of gray color is adjusted to a first point close to an origin in an ab plane in a CIELab color space where a color adjustment is performed, and when the ratio is less than a predetermined value, the color of the area of gray color is shifted to a second point by a predetermined value toward the negative direction along the b axis in the ab plane in the CIELab color space, whereby color image data is generated.

4. The color image processing method according to claim 3, wherein color image data is generated by performing, in accordance with the ratio, the color adjustment on color of the area of gray color to a point between the first point close to the origin in the ab plane in the CIELab color space and the second point shifted by the predetermined value toward the negative direction along the b axis in the ab plane in the CIELab color space.

5. A computer-readable medium having stored thereon a program for causing a computer to execute a color image processing method comprising:

calculating a ratio of an area of gray color in an input color image data with each value of R, G and B being equal within a predetermined margin of error to an entire area of the input color image data;

determining whether the ratio is greater than a predetermined value; and adjusting color of the area of gray color such that, when the ratio is greater than the predetermined value, the color of the area of gray color is adjusted to a first point close to an origin in an ab plane in a CIELab color space where a color adjustment is performed, and when the ratio is less than a predetermined value, the color of the area of gray color is shifted to a second point by a predetermined value toward the negative direction along the b axis in the ab plane in the CIELab color space, whereby color image data is generated.

* * * * *